(12) United States Patent
Valentine et al.

(10) Patent No.: US 6,567,668 B1
(45) Date of Patent: *May 20, 2003

(54) LOCATOR BARRING FOR SATELLITE-BASED NETWORKS

(75) Inventors: Eric Valentine, Plano, TX (US); David Boltz, Garland, TX (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/946,746

(22) Filed: Oct. 9, 1997

(51) Int. Cl.[7] .................................. H04Q 7/20
(52) U.S. Cl. .................. 455/456; 455/410; 455/427; 455/432
(58) Field of Search ................... 455/509, 422, 455/435, 445, 565, 433, 456, 457, 560, 561, 12.1, 13.1, 427, 410, 411, 432, 428, 429, 430, 461

(56) References Cited

U.S. PATENT DOCUMENTS

| | | | | |
|---|---|---|---|---|
| 5,444,450 A | * | 8/1995 | Olds et al. | 342/357 |
| 5,448,623 A | * | 9/1995 | Wiedeman et al. | 455/430 |
| 5,473,671 A | * | 12/1995 | Partridge, III | 455/445 |
| 5,561,836 A | | 10/1996 | Sowles et al. | 455/12.1 |
| 5,594,947 A | * | 1/1997 | Grube et al. | 455/509 |
| 5,678,197 A | * | 10/1997 | Grube et al. | 455/517 |
| 5,715,297 A | * | 2/1998 | Wiedeman | 455/427 |
| 5,732,349 A | * | 3/1998 | Sanpei et al. | 455/435 |
| 5,737,731 A | * | 4/1998 | Lester et al. | 455/40 |
| 5,778,304 A | * | 7/1998 | Grube et al. | 455/422 |
| 5,815,808 A | * | 9/1998 | Valentine | 455/422 |
| 5,850,604 A | * | 12/1998 | Dufour et al. | 455/435 |
| 5,862,480 A | * | 1/1999 | Wild et al. | 455/432 |
| 5,867,109 A | * | 2/1999 | Wiedeman | 340/827 |
| 5,905,952 A | * | 5/1999 | Joensuu et al. | 455/433 |
| 5,920,818 A | * | 7/1999 | Frodigh et al. | 455/443 |
| 5,920,820 A | * | 7/1999 | Qureshi et al. | 455/461 |
| 5,940,764 A | * | 8/1999 | Mikami | 455/456 |
| 5,946,618 A | * | 8/1999 | Agre et al. | 455/428 |
| 5,950,125 A | * | 9/1999 | Buhrmann et al. | 455/422 |
| 5,978,670 A | * | 11/1999 | Casoli et al. | 455/411 |
| 5,983,102 A | * | 11/1999 | Gozes | 455/432 |
| 5,995,823 A | * | 11/1999 | Stephens | 455/410 |
| 6,064,875 A | * | 5/2000 | Morgan | 455/410 |
| 6,112,085 A | * | 8/2000 | Garner et al. | 455/428 |
| 6,128,468 A | * | 10/2000 | Wyrwas | 455/12.1 |
| 6,230,017 B1 | * | 5/2001 | Andersson et al. | 455/456 |

FOREIGN PATENT DOCUMENTS

| | | | | |
|---|---|---|---|---|
| EP | 0505106 | * | 9/1992 | H04Q/7/04 |
| EP | 0 655 871 A1 | | 5/1995 | |
| EP | 0676884 | * | 10/1995 | |
| EP | 0788287 | * | 8/1997 | |
| GB | 2 300 787 A | | 11/1996 | |
| GB | 2300787 | * | 11/1996 | H04Q/7/38 |
| WO | WO 93/03585 | * | 2/1993 | |
| WO | WO 95/24809 | | 9/1995 | |
| WO | WO 98/25433 | | 6/1998 | |

OTHER PUBLICATIONS

EPO Search Report dated Feb. 5, 1999.

* cited by examiner

*Primary Examiner*—Charles N. Appiah
(74) *Attorney, Agent, or Firm*—Jenkens & Gilchrist, P.C.

(57) ABSTRACT

A telecommunications system and method for managing the eligibility of access to a satellite-based network by mobile originated and mobile terminated calls by including, for example, within the tables that the Terrestrial Network Manager (TNM) consults, information regarding areas with no allowed service area and areas with restricted service. After the location and the International Mobility Subscriber Identity (IMSI) of the calling and called party are determined, the tables are consulted and a determination is made regarding whether the calling or called party should be excluded from the satellite/beam selection. Advantageously, the systems and methods of the present invention are not dependent on accurate location information being stored in the MSC/VLR.

24 Claims, 6 Drawing Sheets

LOCATOR BARRING FOR SATELLITE-BASED NETWORKS

BACKGROUND OF THE PRESENT INVENTION

1. Field of the Invention

The present invention relates generally to telecommunications systems and methods for managing access to satellite-based networks, and particularly to determining whether specific geopolitical areas and/or individuals are allowed access to the satellite-based network.

2. Background and Objects of the Present Invention

Cellular telecommunications is one of the fastest growing and most demanding telecommunications applications ever. Today it represents a large and continuously increasing percentage of all new telephone subscriptions around the world. A standardization group, Global System for Mobile Communication (GSM), was established in 1982 to formulate the specifications for mobile cellular radio systems.

With reference now to FIG. 1 of the drawings, there is illustrated a GSM Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MS also includes a Subscriber Identity Module (SIM) 13, which provides storage of subscriber related information, such as the International Mobile Subscriber Identity (IMSI) 15, which uniquely identifies a subscriber.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. One such satellite system, which will be implemented in the near future, is the ICO Global Communications network.

The ICO network is a group of mid-range satellites that cover most of the earth. In the ICO network, as shown in FIG. 2 of the drawings, a system of satellites 200 in multiple, non-geosynchronous orbits are used to provide communication between Mobile Stations (MS) 210 and the land-based part of the network, called the Satellite Acces,s Node (SAN) 220. The SAN 220 consists of equipment for communicating with the satellites 200 and through the satellites 200 to the mobile stations 210. The antennae and satellite tracking part of the system is the Radio Frequency Terminal (RFT) subsystem 230, which also provides for the connection of the communication path to the satellite 200. Connected to the RFT 230 is a Land Earth Station (LES) 240, which is similar in function to a combination of the Base Transceiver Station (BTS) 24 and the Base Station Controller (BSC) 23 for GSM based systems, as illustrated in FIG. 1. Land Earth Stations (LESs) coordinate communications to and from the satellite 200 and the respective local systems servicing the area, e.g., other cellular systems 10 attached to the satellite-based system 205.

Within the ICO network, a function exists in the LES 240 for calculating what "Service Area" 250 a system access is being requested from. This Service Area 250 can in turn be mapped onto a country or state for the purpose of disabling ciphering or routing emergency calls, e.g., 911 calls, to the nearest emergency center in order to meet regulatory requirements and to provide the correct language set.

A Terrestrial Network Manager (TNM) 280 performs some of the functions of the BSC 23 of FIG. 1 as well as additional functions unique to satellite based systems, such as multi-SAN paging and routing of registration messages to the correct MSC/VLR 290. One key function of the TNM 280 is the ability to map paging requests (which are broadcast messages to the MS 210, using the IMSI 15, to instruct the MS 210 to respond, e.g., by sending a CM SERVICE REQUEST message), using X,Y coordinates, onto the resources needed to execute the paging. In other words, based on the coordinates, the TNM 280 can determine which LES 240 is the most suitable for paging. In addition, the TNM 280 consults a database 260, which includes a set of tables, to decide which Channel Managers, contained within the LES 240, and satellite beams should be used for paging.

The ICO network currently provides service across most of the earth, including the north and south poles using 12–20 SANs, each of which can, under various circumstances and depending on configuration and satellite visibility, provide service to almost anywhere in the world. However, such ubiquity of service carries a price. In order to operate within a jurisdiction, the service provider (ICO network) must obtain a license from that jurisdiction, which involves conforming to various requirements, such as providing the ability to handle emergency calls. Different geopolitical areas have different licensing requirements, and not all licensing requirements are likely to be met at the same time.

Each satellite 200 within the ICO network has the ability to provide service to a large area, which can include numerous distinct countries or other jurisdictions, e.g., states, each with separate licensing agreements. With reference now to FIG. 3 of the drawings, a difficult situation arises when a satellite 300, which covers countries A 310, B 320, C 330, D 340, and E 350, receives an operating license in Country A 300, B 310 and D 330, but not in Country C 320.

The situation becomes even more complicated if, in addition to the foregoing, a restricted operating license is granted in Country E 350, in which only certain subscribers within Country E 350 are allowed access to the system from only certain areas, such as Country E 350 and Country E's 350 allies. In other words, in this situation, access is denied completely for some "regulatory areas", e.g., Country D 330, and denied for certain groups of subscribers or subscribers attempting to place calls from unauthorized areas for other regulatory areas, e.g., Country E 350.

Due to the method in which mobility management is handled in the ICO network, such as Service Area mapping without location area Location Updating, it is not presently possible to meet these requirements for mobile terminating calls. The ICO network does not have location areas, and therefore, Location Updating restriction checking is not presently possible.

It is therefore one object of the invention to provide means for storing, within a satellite-based network, the geopolitical areas and individuals allowed access to the network.

It is a further object of the invention to provide means for determining, based on the information stored within the network, whether the called party is allowed access to the network.

It is still a further object of the invention to provide means for determining, based on the information stored within the network, whether the calling party is allowed access to the network.

SUMMARY OF THE INVENTION

The present invention is directed to telecommunications systems and methods for managing access to a satellite-based network by including within, for example, the tables that the TNM consults, information regarding areas with no allowed service and areas with restricted service. Once the location and the International Mobility Subscriber Identity (IMSI) of the calling and/or called party are determined, the tables can be consulted to determine whether the calling and/or called party should be excluded from the satellite/beam selection. This requires the IMSI to always be sent in the page request. Advantageously, the systems and methods of the present invention are not dependent on accurate location information being stored in the MSC/VLR.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The location barring satellite system of the present invention can be implemented during both mobile originated and mobile terminated calls. For example, for mobile terminated calls, the called party's access to the satellite-based system can be checked based on the location and identity of the subscriber. Therefore, the present invention defines a database with either one or two keys. In situations where all service is prohibited for a certain service area, only one key is necessary: the service area identifier. In situations where access to the network is selectively disabled, two keys are required: the service area identifier and the identity of the subscriber, e.g., the IMSI 15. In either case, a look-up into the database, which contains the excluded or included areas and subscribers, indicates whether access to the network is allowed or not.

Logically, the database and associated logic can be located in at least three places: the LES 240, the TNM 280 or the MSC/VLR 290. It should be understood that the logic and handling in each of these embodiments is substantially identical regardless of where the database and logic are located.

Figure 1:
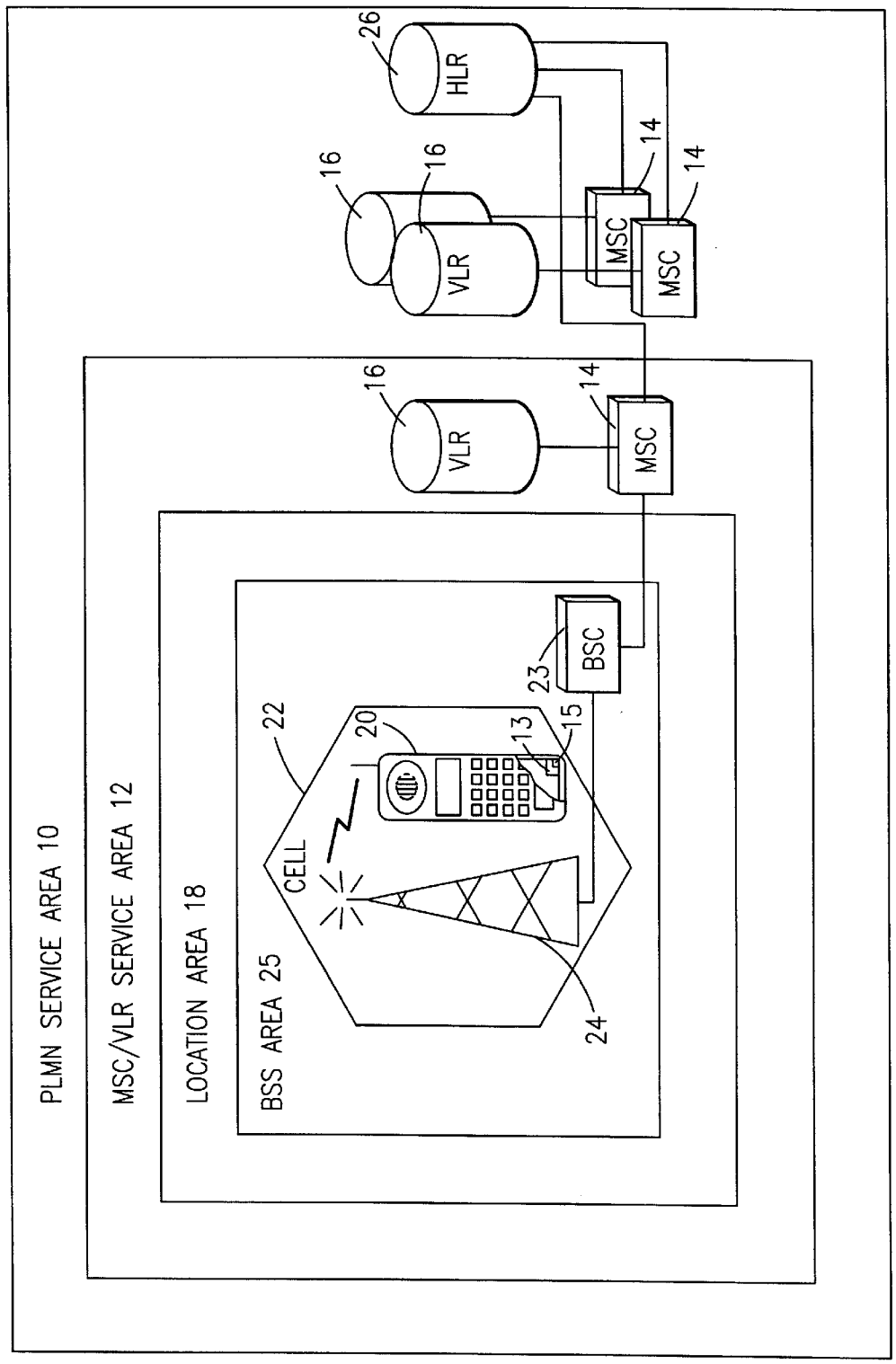
FIG. 1 is a block diagram of a conventional terrestrially-based wireless telecommunications system.
Figure 2:
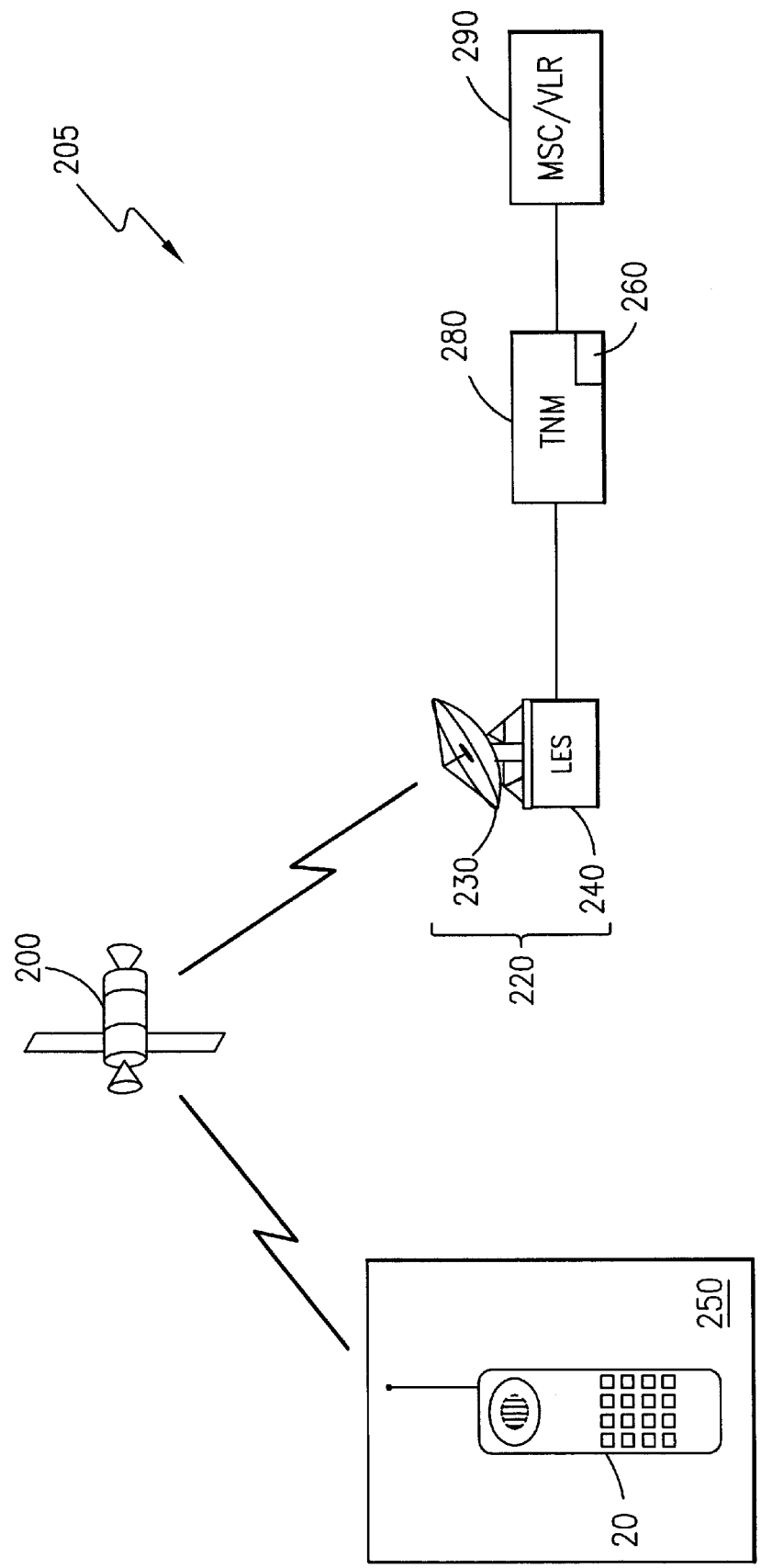
FIG. 2 is a block diagram illustrating aspects of a sample satellite-based network.
Figure 3:
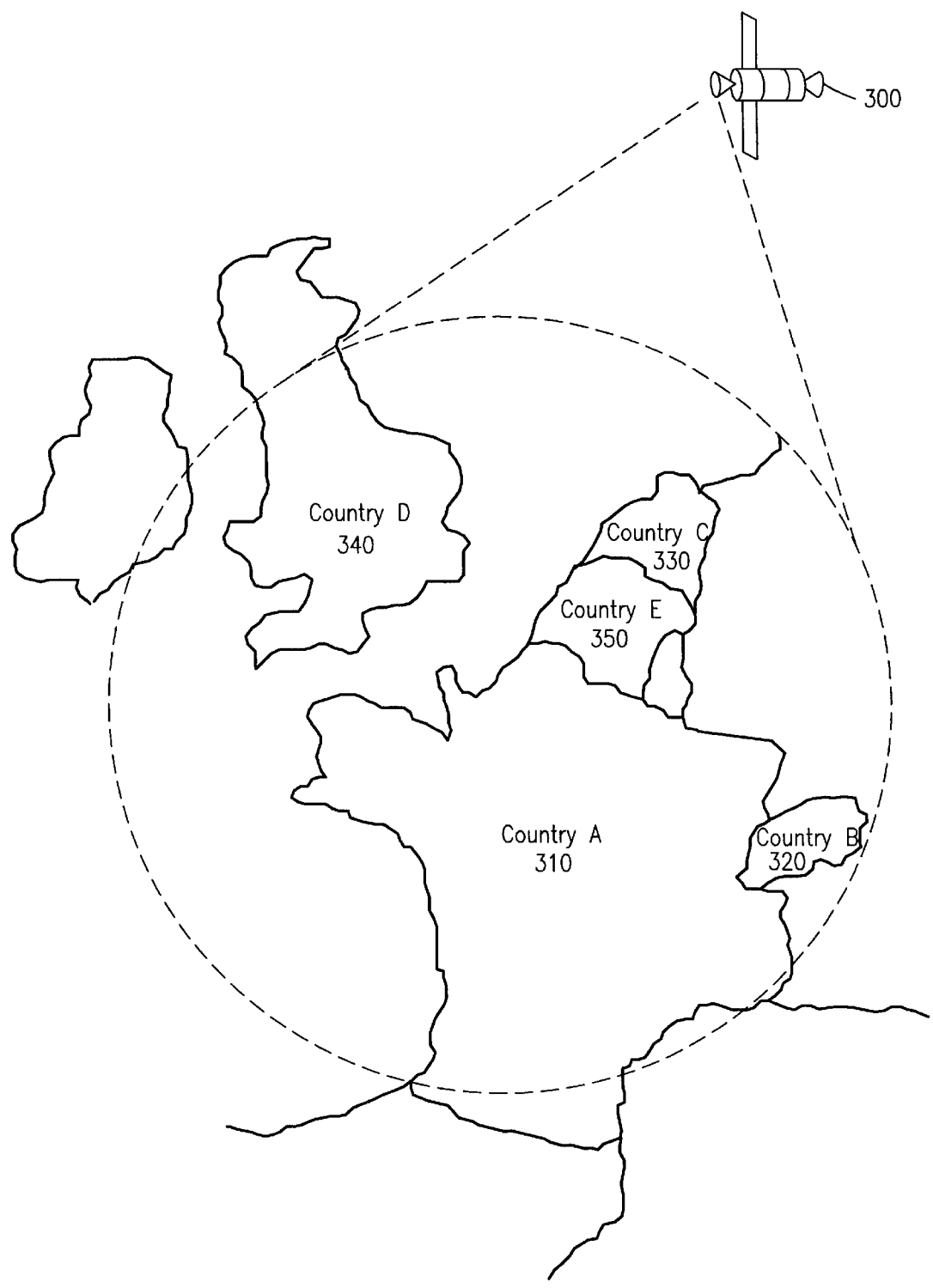
FIG. 3 is a perspective view of a satellite in the satellite-based network shown in FIG. 2, the satellite covering several geopolitical areas.
Figure 4A:
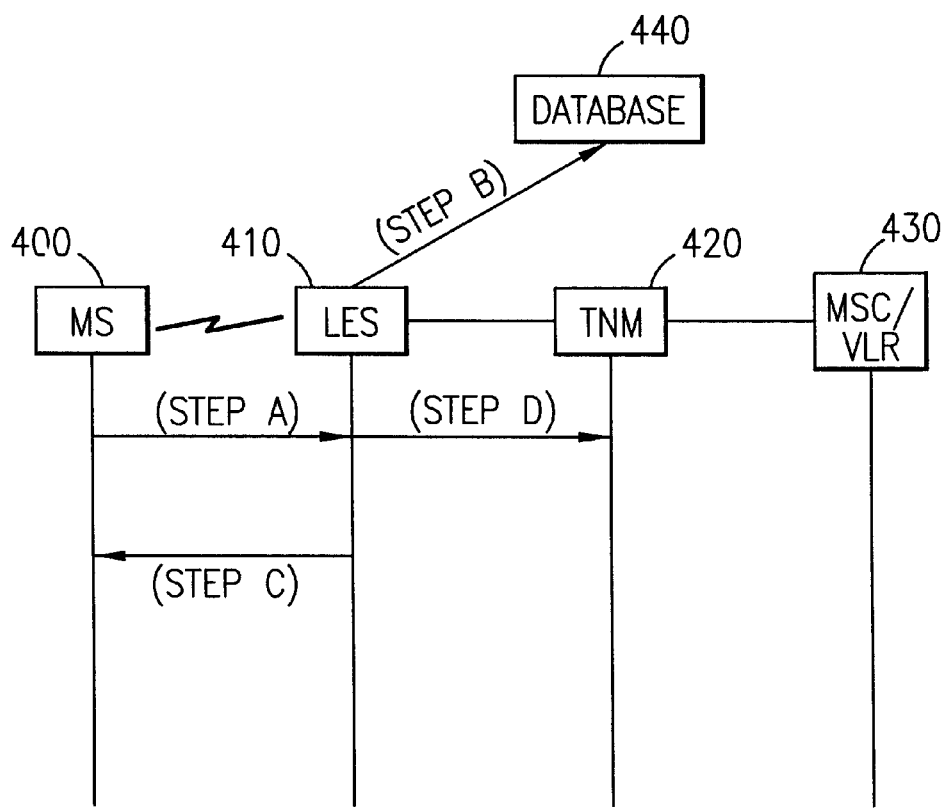
FIGS. 4A–4C are charts illustrating steps followed in preferred embodiments of the location barring satellite system of the present invention.

A first embodiment of the present invention is shown in FIG. 4A of the drawings where the database 440 and associated logic are located in the LES 400. Accordingly, when the Mobile Station (MS) 410 requests a location update (step A), the LES 400 consults the database 440 (step B) using either the one- or two-key mechanism, and, if access is denied, returns a Location Updating Reject (step C) to the MS 410 with the appropriate cause code, as is well known in the art. Otherwise, the Location Update Request is forwarded on to the TNM 420 (step D).

Figure 4B:
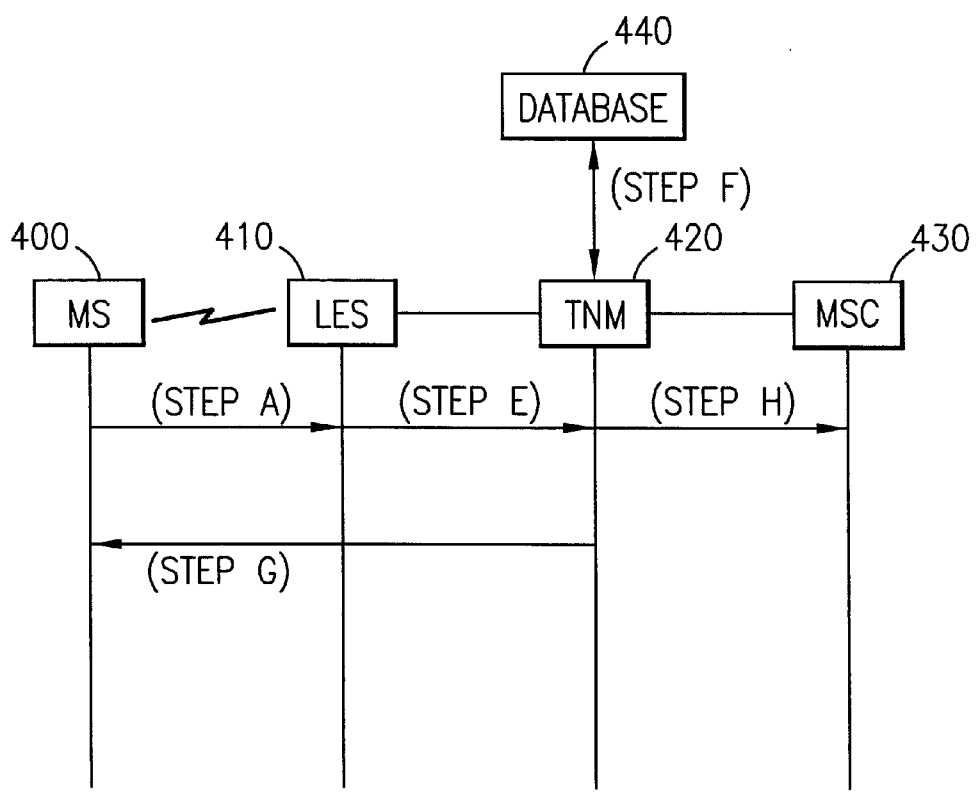

However, in a second embodiment of the present invention, if the mechanism is located in the TNM 420, as indicated in FIG. 4B, the LES 410 forwards the Location Update Request to the TNM 420 (step E) without checking for service area barring. The TNM 420 then consults the database 440 (step F) as described hereinbefore and, if access is barred, sends the rejection notice to the MS 400 via the LES 410 (step G). Otherwise, the Location Update Request will be forwarded to the MSC/VLR 430 (step H) for normal processing.

Figure 4C:
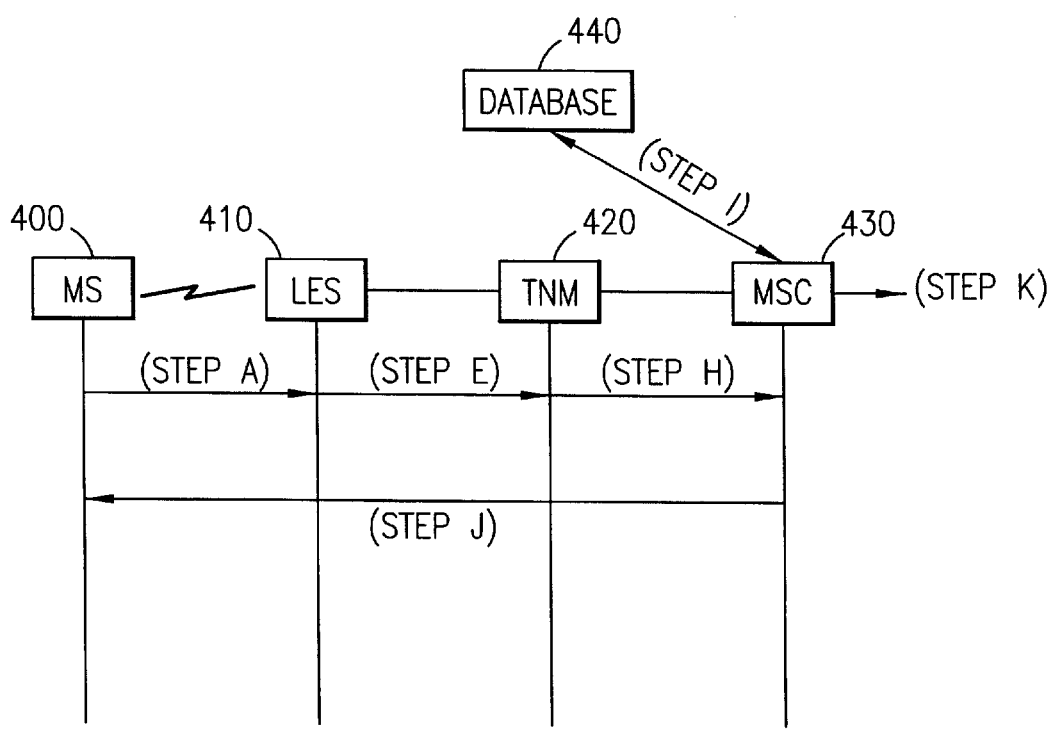

Alternatively, as depicted in FIG. 4C, illustrating a third embodiment of the present invention, if the mechanism is located in the MSC/VLR 430, the Location Update Request is forwarded to the MSC/VLR 430 by the LES 410 and the TNM 420 (step H). The MSC/VLR 430 then consults the database 440 (step I) for service area barring. If access is denied, the Location Update Reject message is returned (step J), otherwise normal handling is followed (step K), as is well known in the art. The hereinbefore mentioned steps can also be implemented for service requests, e.g., for a request for call establishment when no Location Updating has been performed.

In an alternative embodiment, for mobile originated calls, the mapping to Service Area function can provide the ability to route calls based on where they originate. This provides a built-in mechanism for barring call origination for the "complete barring" case: simply route all calls from a particular service area to an announcement machine or to call rejection logic.

However, for calls which terminate in a forbidden area or to a forbidden subscriber, a mechanism is required for barring incoming calls. In another preferred embodiment of the present invention, a database 440 similar to the one described hereinbefore is used to bar incoming calls. This database 440, which preferably resides at the TNM 420, uses X,Y coordinates (e.g. latitude and longitude), along with the IMSI 15, as database keys. When a paging request is received, the database 440 is consulted to determine access to the satellite network 205. If the X,Y coordinates fall into a barred or provisionally barred (based on the IMSI series 15) area, the TNM 420 discards the paging request. (There is normally no negative page acknowledgment.) This will lead to a call treatment similar to the treatment of "unreachable" calls. For example, after the paging timer in the MSC/VLR 14/16 expires, paging may be re-attempted, and if still no response is received from the MS 20, that page request is discarded as well. The paging timer typically varies between 5 and 30 seconds, but is preferably 10 seconds. After the paging logic is completed in the MSC/VLR, "unreachable" treatment in the MSC/VLR 14/16 can be applied.

It should be noted that the network architecture for ICO Global Communications is used for illustrative purposes only, and that the innovative concepts of the present invention can be applied to other telecommunications systems and satellite networks.

As will be recognized by those skilled in the art, the innovative concepts described in the present application can be modified and varied over a tremendous range of applications. Accordingly, the scope of patented subject matter should not be limited to any of the specific exemplary teachings discussed.

What is claimed is:

1. A satellite telecommunications system for determining whether a mobile station is allowed to receive an incoming call, said satellite telecommunications system comprising:
    a database for storing-location information identifying specific areas within said system that are allowed access to said system and identity information associated with said location information, said identity information identifying specific mobile subscribers that are allowed to receive incoming calls within said specific areas;
    location data associated with the location of said mobile station within said satellite telecommunications system; and
    a communication node currently serving an area that said mobile station is located in and in wireless communication with said mobile station via a satellite, said communication node receiving said location data and a paging request including identity data associated with said mobile station for said incoming call, said communication node further accessing said database to compare said location data with said location information and said identity data with said identity information to determine whether said mobile station is allowed to receive said incoming call.

2. The satellite telecommunications system of claim 1, wherein said location information comprises service area identifiers.

3. The satellite telecommunications system of claim 2, wherein said mobile station is prohibited from receiving said incoming call when said location data is a service area identifier included within said database.

4. The satellite telecommunications system of claim 1, wherein said location information included within said database are associated only with areas not permitted access to said satellite telecommunications system.

5. The satellite telecommunications system of claim 4, wherein said identity information corresponds only to subscribers not allowed to receive incoming calls within said associated areas.

6. The satellite telecommunications system of claim 1, wherein said location information included within said database are associated only with areas allowed access to said satellite telecommunications system.

7. The satellite telecommunications system of claim 6, wherein said identity information corresponds only to subscribers allowed access to receive incoming calls within said associated areas.

8. The satellite telecommunications system of claim 1, wherein said identity data is an International Mobile Subscriber Identity associated with said mobile station.

9. The satellite telecommunications system of claim 1, wherein said communication node is a terrestrial network manager.

10. The satellite telecommunications system of claim 1, wherein said communication node is a mobile services center.

11. The satellite telecommunications system of claim 1, wherein said communication node is a land earth station.

12. The satellite telecommunications system of claim 1, further comprising a satellite access node connected to said communication node, said satellite access node comprising a radio frequency terminal for providing communication to said satellite.

13. The satellite telecommunications system of claim 1, wherein said satellite telecommunications system is an ICO Global Communications Network.

14. A method for determining whether a mobile station in wireless communication with a satellite telecommunications system via a satellite is allowed to receive an incoming call, said method comprising the steps of:
    defining a database within said satellite telecommunications system, said database having location information and identify information stored therein, said location information identifying specific areas within said system that are allowed access to said system, said identity information being associated with said location information, said identity information identifying specific mobile subscribers that are allowed to receive incoming calls within said specific areas;
    receiving location data associated with the location of said mobile station at a communication node within said satellite telecommunications system in wireless communication with said mobile station via said satellite;
    receiving a paging request including identity data associated with said mobile station at said communication node;

accessing, by said communication node, said database to compare said location data with said location information and said identity data with said identity information; and determining whether said mobile station is allowed to receive said incoming call based on said step of accessing.

15. The method of claim 14, wherein said location information comprises service area identifiers.

16. The method of claim 15, wherein said step of determining further comprises the step of:

prohibiting said mobile station from receiving said incoming call when said location data is a service area identifier included within said database.

17. The method of claim 14, wherein said location information included within said database are associated only with areas not permitted access to said satellite telecommunications system.

18. The method of claim 17, wherein said identity information corresponds only to subscribers not allowed to receive incoming calls within said associated areas.

19. The method of claim 17, wherein said identity data is an International Mobile Subscriber Identity associated with said mobile station.

20. The method of claim 17, wherein said communication node is a terrestrial network manager.

21. The method of claim 17, wherein said communication node is a mobile services center.

22. The method of claim 17, wherein said communication node is a land earth station.

23. The method of claim 14, wherein said location information included within said database are associated only with areas allowed access to said satellite telecommunications system.

24. The method of claim 23, wherein said identity information corresponds only to subscribers allowed to receive incoming calls within said associated areas.

* * * * *